Dec. 26, 1961   J. C. BLOOM ET AL   3,014,462
ROTARY ACTUATOR SEAL
Filed June 30, 1959

INVENTORS
JOHN C. BLOOM AND
JAMES V. WALKER
BY Edwin Coates
— ATTORNEY —

3,014,462
ROTARY ACTUATOR SEAL
John C. Bloom, Inglewood, and James V. Walker, Hermosa Beach, Calif., assignors to Douglas Aircraft Company, Inc., Santa Monica, Calif.
Filed June 30, 1959, Ser. No. 823,891
4 Claims. (Cl. 121—97)

This invention has to do with the problem of reducing the dynamic leakage of power fluid from ultra high-pressure actuated hydraulic apparatus, such as rotary, or oscillatory, actuators. More specifically, the invention is concerned with dynamically and effectively sealing to each other high-pressure actuated moving parts, such as sealing the vaned rotor of an actuator to the stator, housing, or cage thereof and for sealing the parts to the end-closures of the working chamber of the actuator.

This application is in part a continuation of our copending application, Serial No. 746,041, filed July 1, 1958, entitled "Rotary Actuator Seal," now abandoned.

Rotary actuators essentially comprise an elongate hollow stator, or housing, with abutments, ribs or lands extending radially inward from the inner cylindric surface of the stator, this stator enclosing coaxially a generally cylindric rotor having vanes extending radially outwardly from the cylindric rotor, said vanes being complementary, as it were, to the abutments and adapted to be rotatably impelled, oscillatorily, by the pressure fluid. The vanes are usually sealed to the stator's inner cylindric surface by mere metal-to-metal contact and the abutments are sealed to the cylindric surface of the rotor also by mere metal-to-metal contact, in the basal type of actuator generally employed.

As in the aforesaid application, this invention also aims to minimize the leakage arising at ultra-high operating pressures of the order of 3000 p.si.. from variations in length of the gland, or housing, and of the sealing element. Tolerance discrepancies with respect to the seals and the surfaces which they abut, and thermal and/or pressural variations affecting the housing and rotor, as well as those arising from end play of the rotor also cause leakage. It also seeks to obviate backlash-caused leakage at the seals upon pressure reversal. More specifically, it extends its ambit to taking care of the rather high rate of leakage that can take place in such devices upon occurrence of the inevitable interferences which usually unseal the hooks of the vanes' C-seals, at the ends of the working chamber, especially upon occurrence of the aforesaid variations, and upon occurrence of axial or end, play, or end float of the rotor.

At the ultra-high hydraulic pressures employed in the present type of actuators these seemingly trival geometrical or configurational matters assume a critical degree of importance. For example, in the present type of device, a gap in the end-sealing arrangement amounting to an area as small as .0015 sq. in., total, will, at pressures of the order of 3000 p.s.i. and upward, allow a leak of 2.4 gals. of fluid per minute through each of the ends of the actuator.

The axial freedom of the rotor is normally of the order of .006 inch to .010 inch. In any actuator lacking the present novelties, .003 inch of axial movement of the rotor away from the end plug would result in the rotor's carrying away the radially inner end portion of the hook of the C-seal a distance of .003 inch from its sealing contact with the circular face of the plug-bearing, opening up a triangular-section radially extending, circumferentially directed leakage gap.

Now, if the length of the hook of the C-seal is one-half inch this gap would have a cross-sectional area of .0015 inch, permitting the aforesaid leakage of 2.4 gal./min. That is, the hook's inner end could not fully contact the end-plug and remain overlapped radially with the periphery of the bore of the end plug bearing, as it must do to seal off leakage which would otherwise occur at this point. The tolerance-discrepancy interference of the bottom of the vane's side groove with the inmost end of the C-hook would radially buckle the C's hook and increase this leakage.

With the aforesaid consideration in mind, this invention provides means that render the seals independent of tolerance variations, rotor end-float, and pressure and temperature variations and maintains a substantially minimum-leakage seal of .002 gal./min., at 3000 p.s.i., at these inner ends of the C-seals as well as elsewhere in the actuator. Broadly, it achieves these results by obviating all the aforesaid possibilities of the occurrence of said interferences, despite unknown tolerance variations.

More specifically, these ends are achieved by (1) extending the lower end of the hooks of the C-seals radially inwardly past the junction of the vane's end groove with the journal and into a novel formation that has a radial extent reaching into the journal of the rotor a predetermined distance, the formation also providing a clearance between the hook's radially inmost ends and the bottom of the vane's side groove; and (2) by extending the recess longitudinally outwardly in the journal such a distance as to provide an equally deep axial recess which runs outwardly beyond the inner face of the end plug to prevent interference of the outer end of this slot with the C's hook on end-play of the rotor. It also provides for a very wide range of seal-tolerance variations in this direction. This formation extends longitudinally to a point so far outwardly of the inner circular face of each end plug that although the outer, or end, face of the longitudinal groove extension of this recess or concave relief cannot contact the outer face of the inner end of the C-hook, the outer face of the C-hook is constrained to always tightly and sealingly abut the entire circular area of the inner face of the plug as well as all surfaces of the vane's side grooves, except the bottom thereof, for these grooves per se now have no bottom, in effect. The C-hook radially overlaps the radially inmost diameter of the centrally bored end plug under all conceivable tolerance discrepancies or variations, thus, in conjunction with the axial extension of the recess, providing room for slight longitudinally outward flexure of the C-hooks in these extensions as well as for inward flexures, and enabling radial inward movement of the hook in the recesses per se.

The C-shaped seal-elements per se are herein contemplated as being pressure-responsive seals, by being composed either of Teflon, that is, or of a suitable mild steel, or stainless steel, or bronze. Two such C-seals are placed side-by-side in each vane in a longitudinally extending precision groove, the grooves and seals overlapping the ends of the vanes and extending radially inwardly of the end-faces of the vanes. A corrugated expander strip is disposed between the C-seals and the bottom of the groove to effect the initial sealing, the 3000 p.s.i. pressure effecting final sealing. Each seal is composed of two unequal-length components, created by a longitudinal and lateral step-cut in the seal. The two C-seals are installed in each groove with the joint of one staggered relatively to that of the adjacent one.

These chief objectives are aided by the further facts that the invention provides the inner surface of the stator, or housing, inwardly of the end of the stator, at each end of the stator, with a definite stop, or seat, in the form of an annular shoulder that establishes an exact, and exactly re-establishable, longitudinal dimensional, or positional, relationship between the inserted end closure or end plug, the seal's hook, and the longitudinally extending portion of the aforementioned slot that is overlapped longitudinally by the plug's inner face. Another recess or bore of greater diameter than that defining this shoulder, lies at the outer end portion of the housing and is threaded for engagement with mating threads on the radially adjacent end of the end plug, thereby to render end-plug installation and removal easy and always accurate.

By virtue of the present improvements, the following heretofore ideal and unachieved, or theoretical advantages, long sought for such actuators, are now actually attained: (1) true linear conformance of the actual positions of the rotor to its theoretical positions; (2) the effective pressure fluid induced output of oscillatory actuators no longer depends upon the varying positions of the rotor or upon the actuator attitude; (3) all bearing loads are reduced to a value so near zero that the simplest type of plug bearings for the actuator can be utilized; and (4) an actuator can be constrained to span the absolute minimum of supporting or environmental structure and to employ the minimum number of bearings and appendages and these can be of the utmost simplicity, thereby actually achieving true, high frequency response and precision operation. The overall result also includes a substantially higher spring constant for the entire system incorporating the present actuator, with, however, a lower total friction and an appreciable reduction in the end play or lost motion in the rotor.

The presently preferred embodiment of these, and other, concepts is, by way of example, illustrated in the accompanying drawings and described hereinafter in conjunction with same.

Figure 1:
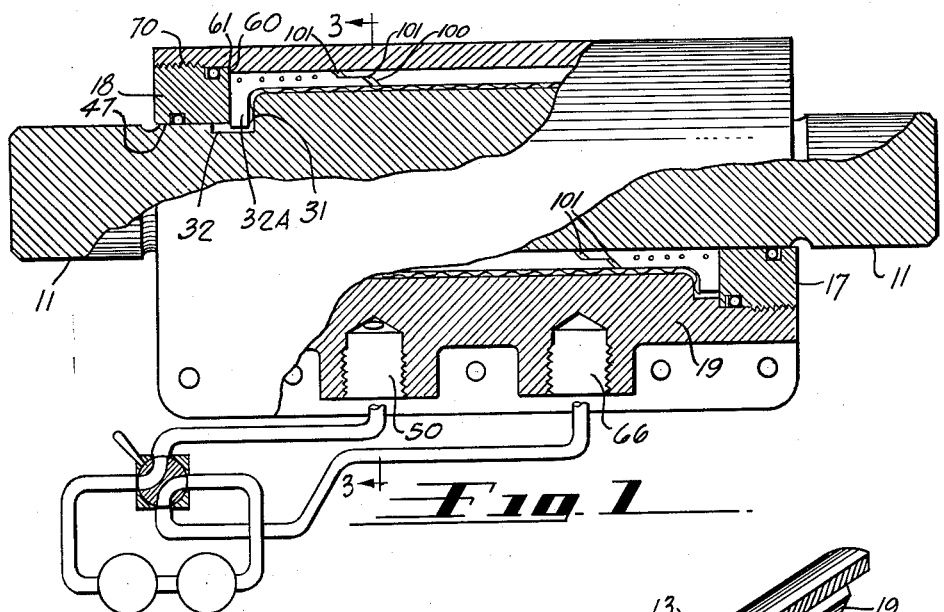
FIG. 1 is a view, partly in side elevation and partly in longitudinal section, of an actuator incorporating the present invention.
Figures 2, 4:
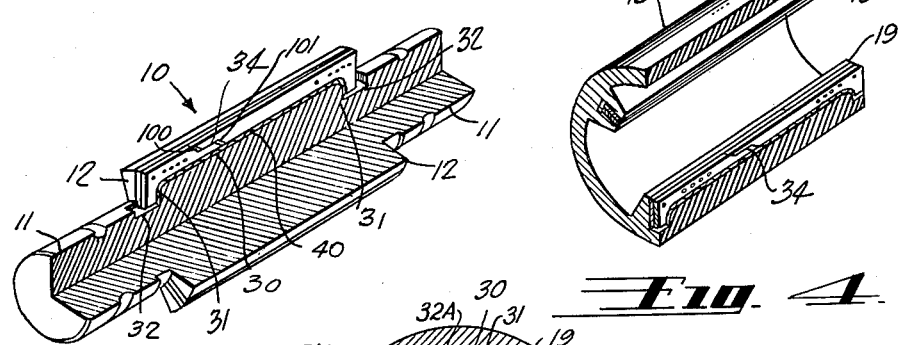
FIG. 2 is a fragmentary perspective view of the rotor of the actuator.
FIG. 4 is a perspective view, partly in longitudinal section, of the stator with abutments mounting sealing elements.
Figure 3:
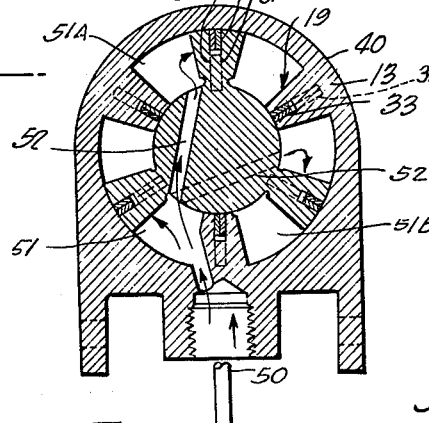
FIG. 3 is a section on line 3—3 of FIG. 1.

The present exemplificatory oscillatory actuator includes a generally cylindric, elongate rotor, 10 with a cylindric journal 11 at each end of the larger central generally cylindric portion of the rotor. Three impeller vanes 12 are circumferentially spaced substantially 120° apart on the periphery of the enlarged cylindric main body.

By means of the journals 11, the rotor is mounted coaxially in a hollow cylindric housing or stator 13, and the working chambers defined by the stator and rotor are closed at each end by means of simple, centrally bored plug-bearings 17 and 18. Thus the housing ends include a centrally longitudinal bore 47. The rotor ends are rotatably supported in such manner as to dispose vanes 12 in very close proximity to the wall of the bore.

The inner surface or wall of the stator, between the vanes, is provided with three radially inwardly extending lands or abutments 19 disposed 120° apart circumferentially, but offset with respect to vanes 12. The inner end-faces of the lands 19 lie in close proximity to the cylindric central body portions of the rotor that lie between the vanes.

The otherwise-open opposite ends of the casing of the actuator are tightly closed by the dual-function, closure and bearing members or end-plugs 17 and 18, each of which members 17 and 18 is properly statically sealed to the casing in the conventional manner shown, with static sealing means. Each of the centrally bored end-plugs rotatably supports a journal of the elongate, vaned rotor, to be hydraulically oscillated.

Each of the three vanes bears a sealing groove 30 for seating the C-seal elements, and it extends longtiudinally of the outer, or "side," face of the vane. This groove is rectangular in cross-section and has a depth greater than the depth of the sealing elements per se. Continuations 31 of the groove 30 are carried down the two end-faces of the vane and extend radially inwardly in the cylindric main body of the rotor below the outer surfaces of the journals, as slots 32. These radial continuations are of the same width and depth as those in the longitudinal portion of the vane, except where they extend outward adjacent to the rotor shaft end bearing.

In the junction region of the intersection of the continuation portions 31 of the sealing groove with the respective journal adjacent thereto, the slot 32 extends radially into the rotor for a predetermined distance. This distance is determined by taking into consideration the expected amount of the indeterminate variations in tolerances usually found existing as between the actual rotor dimensions and the actual casing dimensions, particularly diametrally, and the actual seal dimensions and the actual groove dimensions. Also entering into these considerations is the fact that the present actuator is intended to operate at upwards of 3000 p.s.i. Thermal expansion coefficients further determine this depth. However, the parameters resulting from these considerations are readily determinable for each case.

Slot 32 also extends longitudinally along the journal a predetermined distance at the same predetermined depth as that of the inner end. Its longitudinal extent is such as to cause an appreciable portion of its length to be overlapped longitudinally by the plug-bearing, for reasons later made manifest. The radially inward dimension or extent of the slot provides inward radial overlap of the C-seal past the periphery of the central bore in the plug so as to anticipate the indeterminate variations of manufacturing tolerances as well as the effects of the radially-outward deflection of the housing under the ultra-high pressures employed herein, and end-play as well. The slot 32 is given an axial, or longitudinally outward extent, to such a degree that it runs outwardly far past the inner peripheral edge of the bore in the end-plug so that the seat or end wall of the slot can, under no conceivable circumstances, react on, and hold off, the inner end of the C-seal from full, tight sealing contact with the inner face of the end-plug.

In each of the grooves, and coextensive with both the vane's side face and its end-faces, is mounted, side-by-side, a pair of C-shaped sealing elements 33. Each element is somewhat rigid but, especially when composed of polyfluoroethylene, is capable of sufficient multi-directional surface "flow," yielding, or flexure to conform tightly to the surfaces to be sealed, even though the latter may contain imperfections.

Each sealing element is made up of two unequal-length portions, established so by means of longitudinally stepped cuts 34. The short portions, 100, of the cuts do not run at right angles to the edges of the seals but slant backwardly toward the adjacent ends of the seals. That is to say, the ends 100 of the seal segments created by these step cuts abut on an inclined plane, rather than meeting each other squarely.

The purpose of this configuration is to facilitate assembly of the seals in their grooves. Since this assembly must be effectuated "blindly," the groove being then invisible and the abutting of the segments not being visible, square-ended segments, or rectangular cuts, would interfere with each other and unseat the seal-segments. However, herein the inclined faces slide on each other instead of mutually abutting and interfering, thus enabling accurate "blind" assembly. It is desirable that each segment of each element be provided with mating-code markings, such as a pattern of dots, in order to insure perfect end-joint matching on assembly and re-assembly thereof. These elements are installed in the sealing groove with the joint in one element staggered longitudinally relatively to the joint in the other element, thereby providing sealing continuity despite the joining. Each end portion of each element is so lap ground as to provide the sharpest achievable edges and corners and to assure perfect rectangularity where required.

The radial depth of each slot 32 is such as to allow the incurved, or hooked, inmost end 32A of each precision-made C-shaped sealing element a predetermined clearance from the bottom of the slot, thereby not only allowing for tolerance variations but for thermal expansion as well, so as to effect adequate sealing despite these two influences. The slots 32 extend outwardly along the journal a distance sufficient to prevent the axial play of the rotor from urging the slot's end wall against this hook and displacing the hook of the C away from the inner, circular edge of the adjacent end plug.

Summarizing, indeterminate tolerance variations and variations due to the ultra-high pressures and temperatures employed often cause, in such actuators, two kinds of unsealing interferences at the inmost end of the hook on the C-seal in connection with the conventional, continuous periphery "plain-cylinder" journal of the rotor: (1) at the bottom of the vane's side groove or junction of the radially inner end of the side groove in the vane with a conventional continuous cylindric periphery of the journal, there may be such tolerance discrepancies in the length of the C's hook as would always result in the possibility of forcing this hook to buckle "upwardly" in the end-groove of the vane, thereby unsealing the C-seals from the end plug; and (2) at the junction of the conventional cylindric journal with the circular edge of the bore in the end plug, on the inner face of the latter, end play of the rotor might urge the inmost end of the C's hook away from sealing contact with the entire face of the end plug. Certainly, if the slot 32 were not extended far outwardly of the plug's inner face, the outer end face of the slot would, on inward end play cause the hook to become unsealed.

By the aforedescribed configuration, all these dangers are totally obviated, within a reasonable tolerance range.

The groove 31 in the end face of the vane opens directly into the slot 32 in the journal, completing the perimetral sealing of the vane. Further, sealing is maintained, without interference or jamming, between the inner peripheral edge of each of the annular clearance spaces lying between the ends of the vanes and the adjacent circular face of the end-plug.

Underlying the full extent of each C-seal is a resilient strip of corrugated metal 40, designated as an expander strip. Strips 40 seat on the bottom of the groove, and, as "expanders," bear also on the lower or inner face of each C-seal. They bias the seal elements not only radially, but also longitudinally, that is, toward the confronting surface of the casing, and forcibly seat the hooks of the C-seals against the radially "outer" disc-area of the inner faces of the end plugs.

Each of the lands, or abutments 19, protrudes inwardly from the wall of the hollow casing and bears a longitudinal groove. Each groove seats a pair of C-seals 33, substantially identical to those aforesaid as to composition, shape arrangement, step-cutting, staggering and coding. Also, similar resilient corrugated expander strips 40 underlie each pair of C-seals in each groove. The grooves in the abutments are "undercut" at each end to sealingly accommodate the incurved, or hooked, ends of the C-seals.

As best seen in FIG. 1, each end-plug 18 is mounted in a housing-bore having two diameters. At the inner portion of this bore-region, the bore portion 60 is plain or smooth-walled and smaller than that at the outer end and provides an annular shoulder or stop 61 adapted to seat the outer periphery of the circular inner face of the plug. The bore 70, at the outer-end region of the housing, is of larger diameter than bore 60 and is threaded, as shown. The outer end of the plug is matingly threaded.

Shoulder 61 is so located with reference to the longitudinal thickness of the seal-ends and to the length of slot 32 as to establish, and enable re-establishment, of an exact, predetermined dimensional relationship between the position of the inner circular face of the plug and the seal-ends and slot 32. That is, by this configuration, this dimensional relationship can be accurately established initially and repeatedly re-established just as accurately upon replacing the plug after removal thereof. Moreover, shoulders 61 are so located as to determine the positions of the inner faces of the plugs, so that an exact inner longitudinal dimension of the casing is established, so that the desired end float of the rotor of approximately .006 inch can be achieved.

One mode and means of powering the actuator is shown as comprising a pressure-fluid inlet passage 50 in the housing 13 leading to a receptor-cavity or chamber 51. Bores 52 direct this fluid to similar chambers 51A and 51B. An exhaust outlet 66 is provided in the housing and opens into cavities defined between the opposite side of an abutment and the adjacent vane from those aforementioned. Both openings 50 and 66 are connected in the conventional manner by suitable conduitry, shown, to a two-way control valve, shown, and to an energy source, all three being substantially conventional. The valve controls the rotor speed and its direction of rotation, as is manifest.

Although certain specified nomenclature and finite parameters and shapes have been employed for the sake of concreteness, such specificity in no wise limits the scope of the invention except as required by the ambit of the annexed claims.

We claim:

1. For a rotary actuator having a cylindric casing and having end walls with planar inner faces each face including a central bore, said actuator also including a rotor having a radial vane substantially in contact with the inner wall of the casing and said rotor having journals seated in said bores: a sealing arrangement that comprises a groove extending along the cylindric side face and the end-faces of said vane, said groove extending radially along said end-faces and into the body of the rotor and reaching radially into said journals to a predetermined radial locus; said groove extending from said locus axially in the journal and being substantially confined in its direction to a longitudinal direction; said groove extending axially to a locus that lies considerably longitudinally outwardly of the adjacent end-face of said casing; the axially extending portion of said groove being free and unoccupied to clear anything occupying said locus; and generally C-shaped seals mounted in the side-and-end face portions of said groove with the radially inner end of the C free from and floating in that portion of the groove that reaches radially into the journal; and resilient means backing up said seals for urging same outwardly of the groove and into sealing contact with the outwardly adjacent surfaces.

2. A combination according to claim 1, in which that portion of said groove that extends axially of said journal from said predetermined locus is a blind-slot, open only at its radially outward face and is rectangular in all sections taken transversely of said journal and in which the longitudinally outermost face or wall of said blind slot lies longitudinally beyond the point of contact of the hook of the C-seal with the inner face of the adjacent end-wall of the actuator's casing.

3. For a rotary actuator of the type having a casing and an end wall including a central bore and the actuator also being of the type that includes a rotor having a radial vane substantially in contact with the inner wall of the casing, said rotor including a journal seated in said bore, a sealing arrangement, including: a groove extending along the longitudinal face of the vane and thence inwardly of the actuator along the end face of the vane and extending into the body of the journal to a predetermined locus in the journal, said groove further extending from said locus axially onwardly of the journal to a locus that lies longitudinally beyond said end wall and within said bore; and sealing means mounted in the longitudinally extending portion and also in the inwardly extending portion of the groove in said vane and body in sealing contact with adjacent surfaces of the casing; the innermost end of the sealing means terminating within the journal.

4. A sealing arrangement according to claim 3, in which the axially extending portion of said groove has a width substantially equal to that of the remainder of said groove so as to permit free movement of the lowermost end of said seal longitudinally of said portion.

References Cited in the file of this patent

UNITED STATES PATENTS

| | | |
|---|---|---|
| 168,184 | Reily et al. | Sept. 28, 1875 |
| 1,470,113 | Davis | Oct. 9, 1923 |
| 1,737,082 | Gough | Nov. 26, 1929 |
| 1,799,294 | Gough | Apr. 7, 1931 |
| 1,991,634 | Silver | Feb. 19, 1935 |
| 2,060,804 | Friestedt | Nov. 17, 1936 |
| 2,164,876 | Horlacher | July 4, 1939 |
| 2,778,338 | Shafer | Jan. 22, 1957 |
| 2,790,520 | Kuhn | Apr. 30, 1957 |
| 2,793,623 | Ludwig et al. | May 28, 1957 |
| 2,854,956 | Hager | Oct. 7, 1958 |
| 2,870,748 | Hemphill | Jan. 27, 1959 |
| 2,893,794 | Ilens | July 7, 1959 |